(12) United States Patent
Kiani et al.

(10) Patent No.: US 11,269,137 B2
(45) Date of Patent: Mar. 8, 2022

(54) WAVELENGTH SELECTIVE FILTERING WITH NON-RADIAL ARRAY OF MICROSTRUCTURE ELEMENTS

(71) Applicant: Lawrence Livermore National Security, LLC, Livermore, CA (US)

(72) Inventors: Leily S. Kiani, Napa, CA (US); Jay W. Dawson, Livermore, CA (US); Derrek R. Drachenberg, Livermore, CA (US); Michael J. Messerly, Danville, CA (US); Paul H. Pax, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 16/887,313

(22) Filed: May 29, 2020

(65) Prior Publication Data
US 2021/0373229 A1 Dec. 2, 2021

(51) Int. Cl.
*G02B 6/02* (2006.01)

(52) U.S. Cl.
CPC ..... *G02B 6/02371* (2013.01); *G02B 6/02052* (2013.01)

(58) Field of Classification Search
CPC .................. G02B 6/02371; G02B 6/02052
See application file for complete search history.

(56) References Cited

U.S. PATENT DOCUMENTS

| | | | |
|---|---|---|---|
| 7,463,806 B2 | 12/2008 | Borrelli et al. | |
| 9,146,345 B1 * | 9/2015 | Dong | G02B 6/0238 |
| 10,033,148 B2 | 7/2018 | Pax et al. | |
| 10,348,050 B2 * | 7/2019 | Dawson | H01S 3/06716 |
| 2004/0096173 A1 * | 5/2004 | Fekety | G02B 6/02347 385/125 |
| 2004/0175085 A1 | 9/2004 | Forbes et al. | |
| 2013/0298380 A1 * | 11/2013 | Mukasa | H04B 10/25 29/428 |
| 2014/0270666 A1 * | 9/2014 | Fini | G02B 6/02357 385/123 |
| 2016/0002089 A1 * | 1/2016 | Matsuo | G02B 6/02347 428/398 |

(Continued)

FOREIGN PATENT DOCUMENTS

| | | | |
|---|---|---|---|
| JP | | 5170909 B2 | 3/2013 |
| WO | WO 2011/160646 A1 | | 12/2011 |

OTHER PUBLICATIONS

Pax, et al., "Scalable waveguide design for three-level operation in Neodymium doped fiber laser," Opt. Express, vol. 24, No. 25, 2016, pp. 28633-28647.

(Continued)

*Primary Examiner* — Ellen E Kim
(74) *Attorney, Agent, or Firm* — Knobbe, Martens, Olson & Bear, LLP

(57) ABSTRACT

A non-radial array of microstructure elements provides enhanced wavelength selective filtering. The elements are arranged along a line that does not intersect the center of the core. In this configuration, the first coupling element in an array that is nearest to the core is a non-integer array unit spacing from the main waveguide where the array unit spacing is defined as the flat to flat distance of a hexagonal cell.

20 Claims, 9 Drawing Sheets

(56) References Cited

U.S. PATENT DOCUMENTS

2017/0229834 A1* 8/2017 Pax .................. G02B 6/02347

OTHER PUBLICATIONS

Kawakami, et al., "Characteristics of a Doubly Clad Optical Fiber with a Low-Index Inner Cladding," IEEE J. Quantum Electron., vol. 10, No. 12, 1974, pp. 879-887.
Soh, et al., "Neodymium-Doped Cladding-Pumped Aluminosilicate Fiber Laser Tunable in the 0.9-μm Wavelength Range," IEEE J. Quantum Electron., vol. 40, No. 9, 2004, pp. 1275-1282.
International Search Report and Written Opinion dated Sep. 9, 2021 in Application No. PCT/US2021/034602, 10 pages.
Kiani et al., "Improved Nd doped silica fiber for E-band amplification", in Optical Fiber Communication Conference (OFC) 2020, OSA Technical Digest (Optical Society of America, 2020), paper W1C.1, 3 pages.

* cited by examiner

WAVELENGTH SELECTIVE FILTERING WITH NON-RADIAL ARRAY OF MICROSTRUCTURE ELEMENTS

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC, for the operation of Lawrence Livermore National Laboratory.

BACKGROUND

Field

The present technology relates to waveguide structures, and more specifically, relates to wavelength selection in optical fibers.

Description of Related Art

Waveguide filtering has been pursued for limiting the spectral and spatial modes supported by a waveguide core. Prior art includes filtering via selective absorption of co-dopants and via optical coupling effects in a modified structure or with substructure inclusions. The addition of selectively absorbing co-dopants in or near the core can be difficult to implement. In the case of co-doping the core, additional dopants can alter the stability of a material, e.g., in glass, added co-dopants generally drive the index higher and the melting temperature lower. If the total dopant concentration is limited by the fabrication process, then the addition of co-dopants lowers the concentration of the primary dopant. Waveguide filtering via waveguide structures, e.g., in depressed well waveguides, is popular but few methods exist to filter in a selected band. FIG. 1 illustrates a prior art wavelength selective filtering waveguide structure 10 formed by an array of hexagonal elements 12 that are arranged in lines that intersect the center of the core 14. It is desirable to enhance the strength of the outcoupling from the core in a selected filtering band.

SUMMARY

The present technology provides a specific geometry of elements that selectively couple to a fiber waveguide core. The elements are arranged along a line that does not intersect the center of the core where the core is the main waveguide in the structure. This specific arrangement allows for the first coupling element in an array that is nearest to the core to be a non-integer array unit spacing from the main waveguide where the array unit spacing is defined as the flat to flat distance of a hexagonal cell formed after the stacked array is drawn down to cane or fiber. The advantage of this design is that it provides enhanced coupling between elements because they are closer together than in the prior configuration and the asymmetry about the core allows for an additional parity orientation to be utilized. Both effects enhance the strength of the outcoupling from the core in the filtering band. The technology has a variety of uses, including uses for wavelength selection in optical fibers.

BRIEF DESCRIPTION OF THE DRAWINGS

The accompanying drawings, which are incorporated into and form a part of the disclosure, illustrate embodiments of the technology and, together with the description, serve to explain the principles of the technology.

DETAILED DESCRIPTION OF THE TECHNOLOGY

For a waveguide structure that is formed by a regular array of elements ('lattice elements') that are then fused together to form an overall structure, and where an integer number of these elements are replaced (before fusing) by a larger circular element (the 'core'), the distance of the remaining lattice elements to the edge of the core can take on multiple values. The minimum distance from lattice element center to core edge is one half of the lattice spacing h (see FIG. 2), if the array including the core is regular. Along lines of the lattice symmetry intersecting the core, the next smallest such distance is one and a half lattice spacings, i.e., one lattice spacing h greater than the minimum. Away from such symmetry lines, there are lattice sites for which the above distance measure falls between the symmetry lines. The present technology uses this feature to adjust the distance between wavelength selective coupling elements in proximity to the waveguide from which light is filtered away to optimize the coupling between elements and hence the filtering strength.

The proximity of the first element in the multi-element substructure influences the coupling strength so it is desirable to choose the placement of the first element with respect to the core so as to optimize that coupling. Optimizing the coupling means achieving sufficiently high out-coupling at wavelengths in the block-band, and sufficiently low out-coupling at the operating wavelength. In general, the multi-element wavelength selective coupler will likely be positioned with some standoff between the main waveguide where the standoff is to avoid excessive out coupling at the operating wavelength. For a truly regular hexagonal array, a gap formed by units adjacent to the core can be one of either distinct widths depending on the line along which they are arranged in the array. By utilizing lines that are non-intersecting with the core in a hexagonal lattice, the first element can be spaced with a gap that is the smaller of the two and thus the coupling is driven harder and the filtering effect is enhanced.

Figure 1:
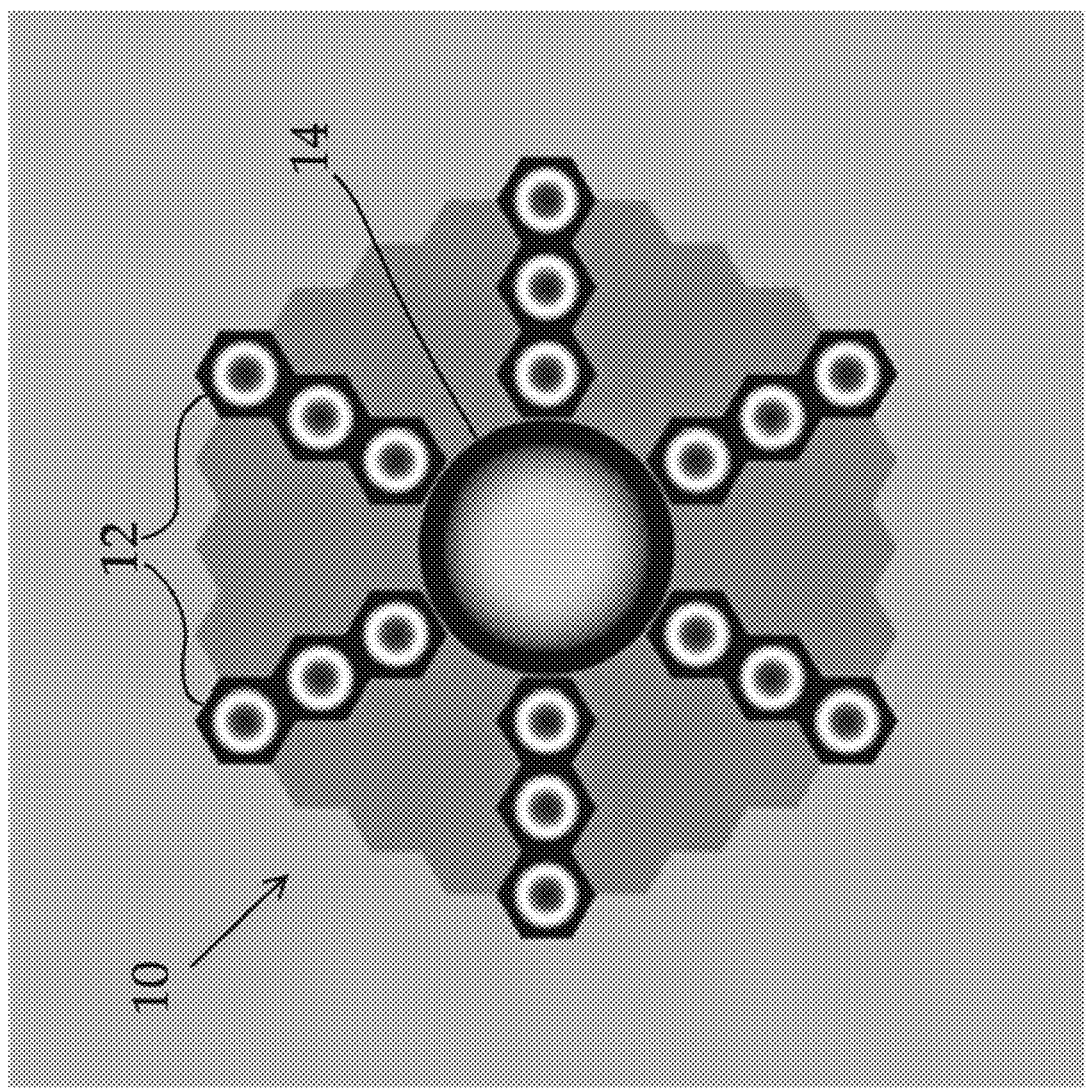
FIG. 1 shows a prior art waveguide having microstructure elements extending radially from a main waveguide located at the center of a hexagonal array.
Figure 2A:
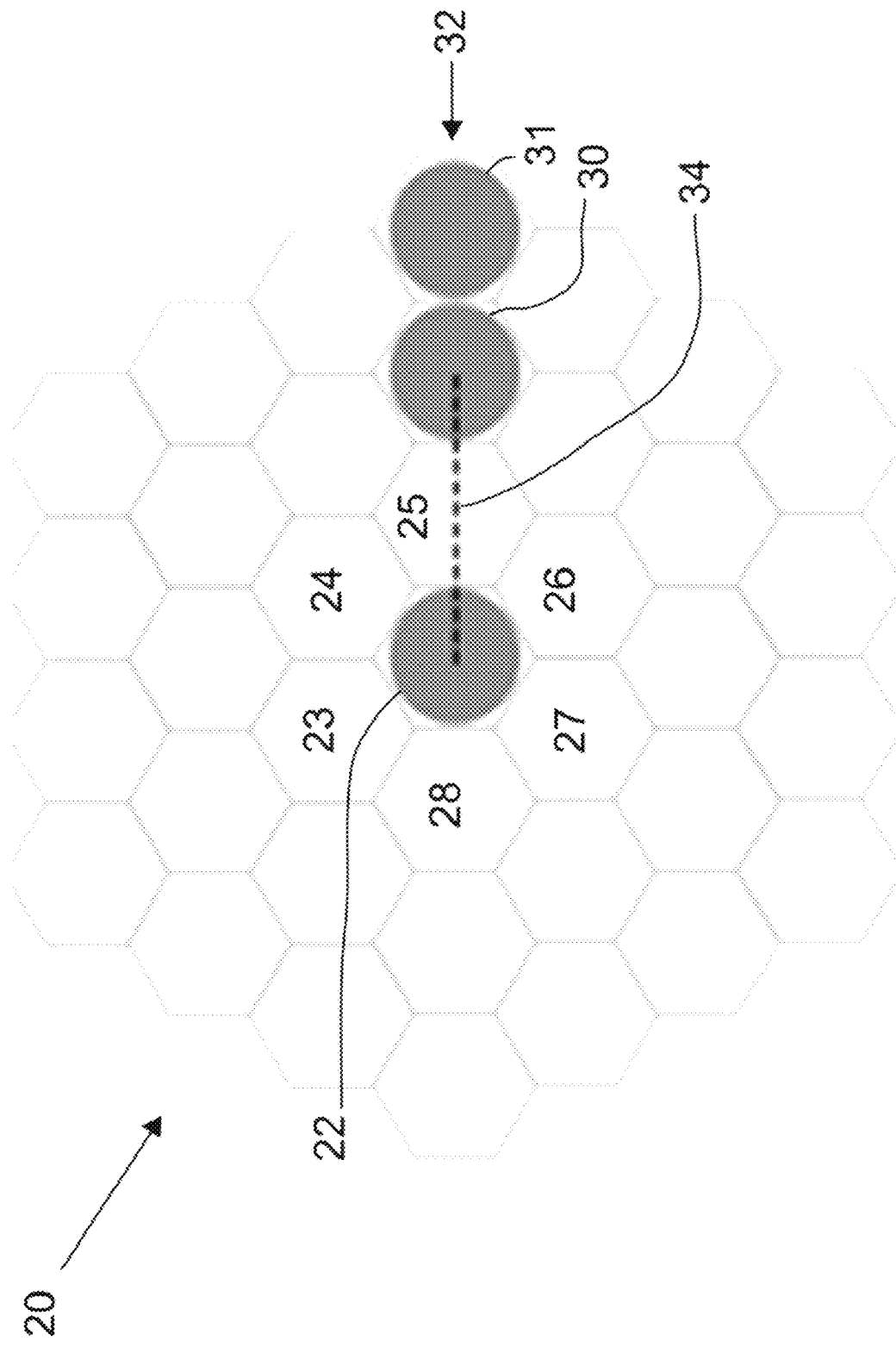
FIG. 2A shows a transverse cross-sectional view of a prior art waveguide.

FIG. 2A shows a transverse cross-sectional view 20 of a prior art waveguide. The figure shows a central core 22 located within a central array 23-28 of hexagonal elements which are part of a larger hexagonal close-packed array of hexagonal elements. Shaded elements 30 and 31, each individually sometimes referred to herein as an outcoupling element, are together sometimes referred to herein as bridge 32. Bridge 32 has an index of refraction that is different from that of the unshaded elements and is typically higher. The effective index of refraction of bridge 32 is chosen so than unwanted modes and wavelengths propagating in core 22 will transfer, e.g., through evanescent coupling, from core 22 to bridge 32, effectively stripping at least a portion and in some cases all of such unwanted modes and wavelengths from core 22. Exemplary designs of waveguides utilizing bridges to transfer modes or wavelengths from or to a destination such as a core are described in, e.g., U.S. Pat. No. 10,033,148, incorporated herein by reference, and in U.S. Pat. No. 10,348,050, also incorporated herein by reference. Based on the teachings herein, those skilled in the art will understand how to apply the present technology to such previous designs. Note that bridge 32 extends radially from core 22. A line drawn from the center of core 22 to the center of element 30 is colinear with a line drawn from the center of element 30 to the center of element 31. A face of each of the six lattice elements 23-28 that are immediately adjacent to core 22 is shown in the figure to form a line that is tangent to the outer circular boundary of core 22. Further, each element of the lattice elements 23-28 has two faces that are perpendicular to a tangent to the outer circular boundary of core 22. The length from one face of each hexagonal element to the opposite parallel face of said hexagonal element is referred to herein a h, i.e., the length from one flat of a cell to the other parallel side of that cell distance is h. In the case where the bridge extends radially from the core, as in FIG. 2A, the distance 34 from the center of the core 22 to the center of the first element 30 of bridge 32 is 2h.

Figure 2B:
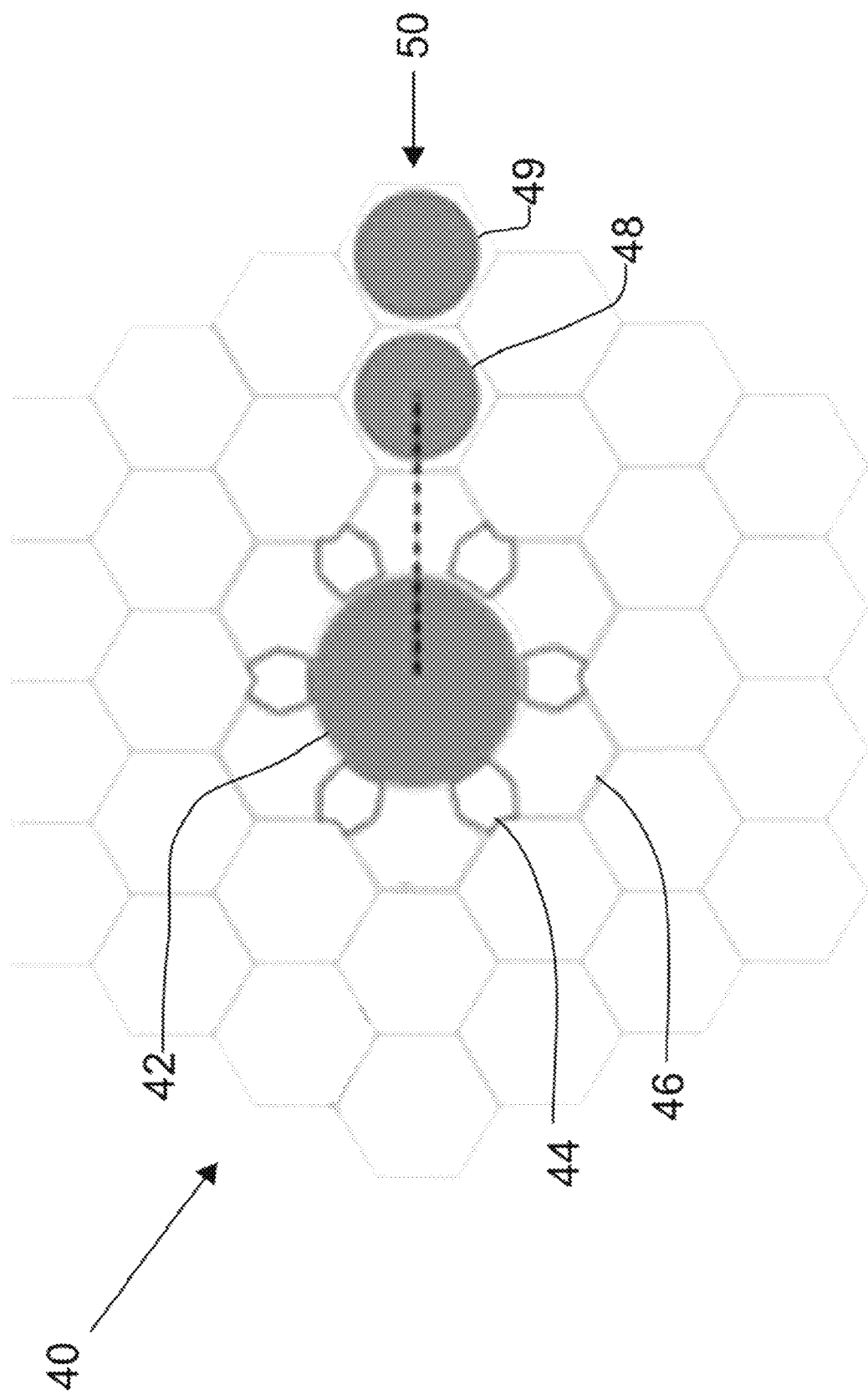
FIG. 2B shows a transverse cross-sectional view of a prior art waveguide having a larger core than that of FIG. 2A.

FIG. 2B shows a transverse cross-sectional view 40 of a length of a prior art waveguide having a larger core than that of FIG. 2A. During the stack and draw fabrication process, 12 circular cross-section rods are placed around core 42. These 12 rods consist of six relatively small, rods and 6 relatively larger rods, which are smaller than the rods that form the outer hexagonal elements. As the waveguide is pulled in the fabrication process, the relatively smaller rods form into non-circular, non-hexagonal elements exemplified as element 44. The relatively larger rods form into elements exemplified as element 46. Note that the shapes shown in the figure are notional and the actual shape will depend on the stack and draw conditions. Note that the use of six small elements 44 and six larger elements 46 is exemplary only. The length from the center of core 42 to the center of the element 48 is 2h. Element 48 and element 49 together form a bridge 50 similar to the one described in FIG. 2A.

Figure 2C:
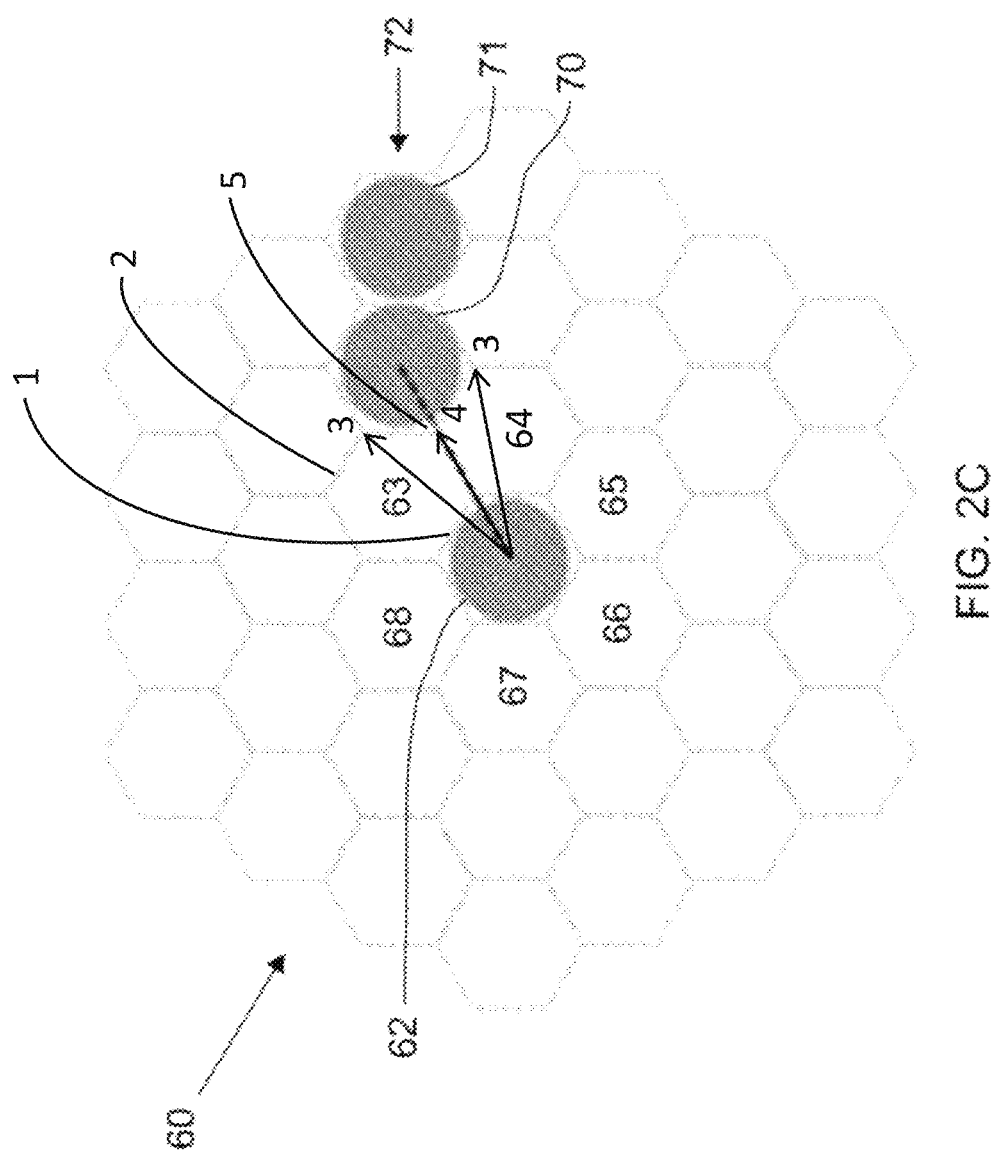
FIG. 2C illustrates an embodiment of the present technology in which the bridge elements extend non-radially from a main waveguide located at the center of a hexagonal array.

FIG. 2C illustrates an embodiment of the present technology. The apparatus 60 comprises a core 62 and a lattice of background material surrounding the core 62 and including a subset 63, 64, 65, 66, 67, 68 of background material in direct contact with the core 62. The subset 63, 64, 65, 66, 67, 68 comprises an inner boundary 1 and an outer boundary 2. The inner boundary 1 is in contact with and is closer to the core 62 than the outer boundary 2. The distance from the center of the core 62 to the outer boundary 2 varies from a maximum value 3 to a minimum value 4 depending upon the direction of the distance from the core 62. The minimum value 4 is located in a valley 5 between maximum values 3. The apparatus 60 also comprises a first outcoupling element 70 located in the valley 5. FIG. 2C illustrates an embodiment of the present technology in which the bridge extends non-radially from a main waveguide located at the center of a hexagonal array. More specifically, the figure shows a cross-sectional view 60 of a waveguide that includes a central core 62 surrounded by a hexagonal lattice of close-packed optically transmissive hexagonal elements, which includes 6 elements 63-68 immediately adjacent to core 62. Elements 70 and 71 form bridge 72 having properties described above. Note that the first element 70 is located such that a line drawn from the center of the core to the center of element 70 passes between elements 63 and 64. This places the element 70 closer to the core than if element had been placed such that a line from the center of the core to the center of element 70 had passed through an element, such as in FIGS. 2A and 2B. In the configuration of the present technology, the bridge extends non-radially from core 62. The distance from the center of core 62 to the center of the first element 70 is the square root of 3 times h. The center-to-center distance in the non-radial case is about 13% shorter than the in-radial extending configuration. By utilizing this design approach where the first bridge element is placed closer to the core than in radially extending configurations, embodiments of the present technology can be used to form multiple non-radially extending bridges such as the embodiment shown in FIG. 2E, discussed below.

Figure 2D:
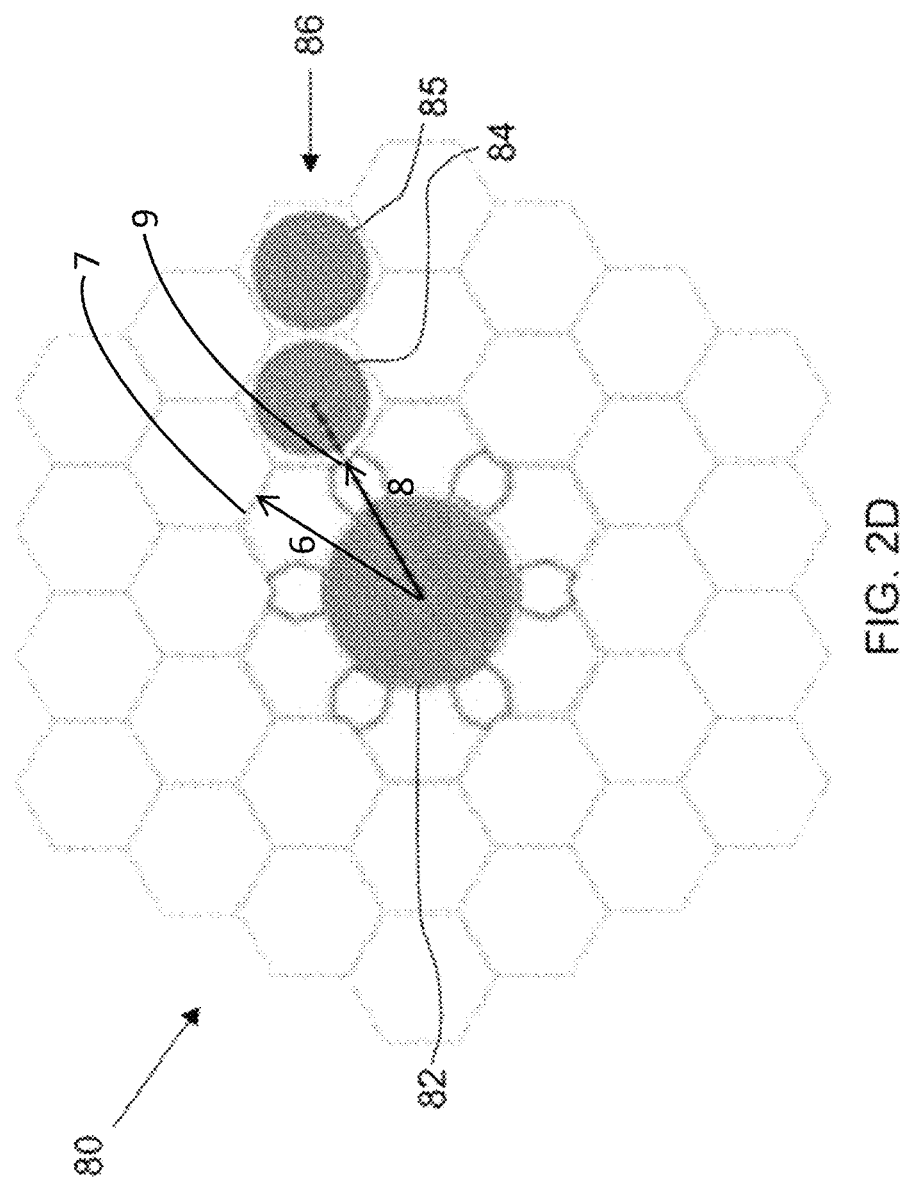
FIG. 2D shows an embodiment of the present technology having a transverse cross-sectional view of a length of a waveguide including a larger core than that of FIG. 2C.
Figure 2E:
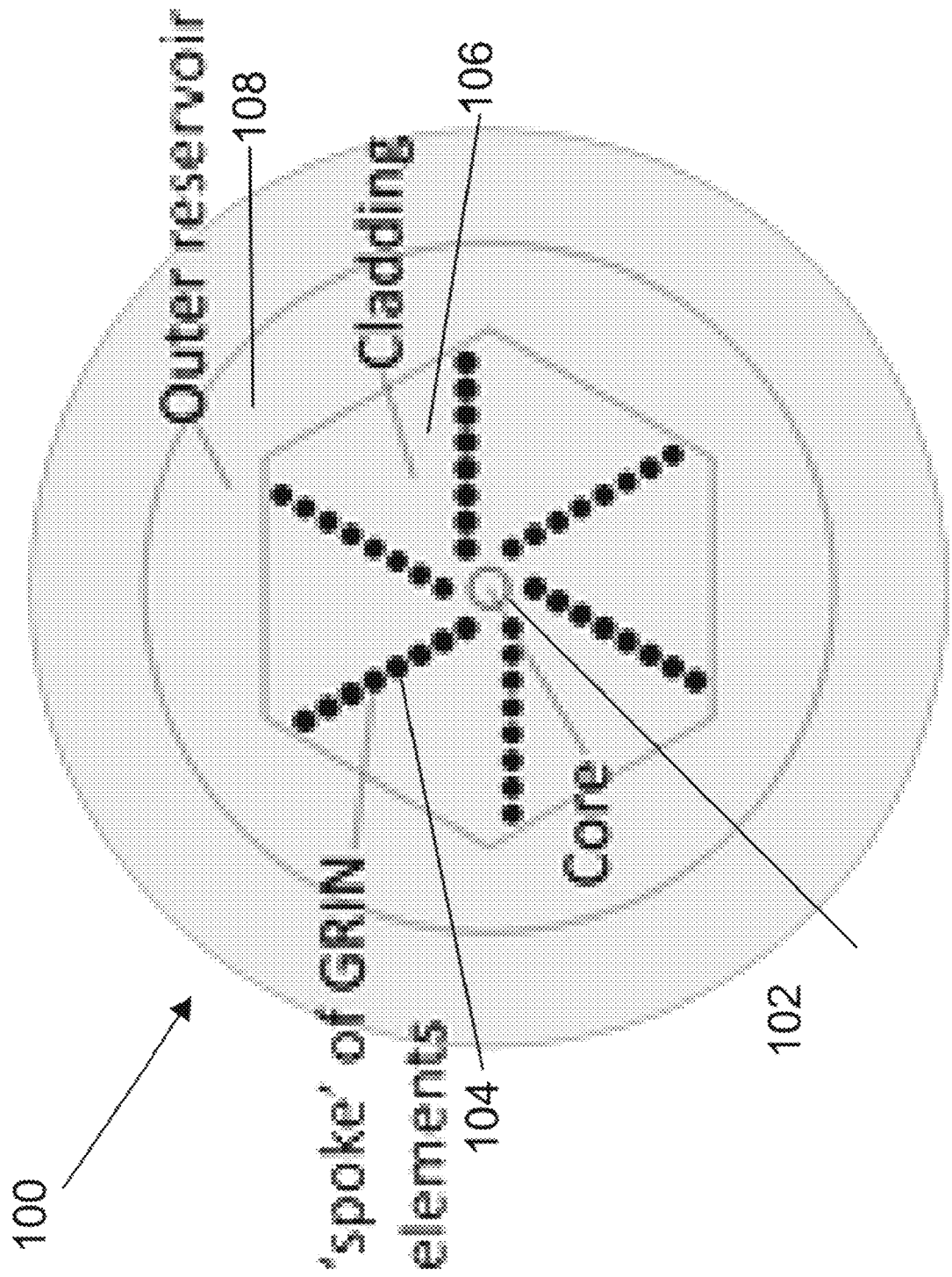
FIG. 2E shows a cross-sectional view of a waveguide of the present technology having a core, 6 non-radial branches exemplified by branch, a cladding and an outer reservoir.

FIG. 2D shows an embodiment of the present technology having a transverse cross-sectional view 80 of a length of a waveguide including a larger core than that of FIG. 2C. This embodiment includes a core 82, a first bridge element 84 and a second bridge element 85, which form a bridge 86 having bridge properties as discussed above. A subset of elements comprises a series of large elements alternating with smaller elements. This design is identical to that of FIG. 2B except that the bridge extends non-radially from the core. The distance from the center of the core to the center of the first bridge element is shorter than that of the radial case of FIG. 2B. In FIG. 2D, a first line 6 drawn from the center of the core 82 to the outer boundary 7 away from the core 82 of each of the large elements is longer than a second line 8 drawn from the center of the core 82 and that bisects the smaller element to its outer boundary 9 away from the core 82. As shown in FIG. 2D, a first branch element 84 has a center located on a line colinear with the second line 8. FIG. 2E shows a cross-sectional view 100 of a waveguide of the present technology having a core 102, 6 non-radial branches exemplified by branch 104, a cladding 106 and an outer reservoir 108.

Figure 3:
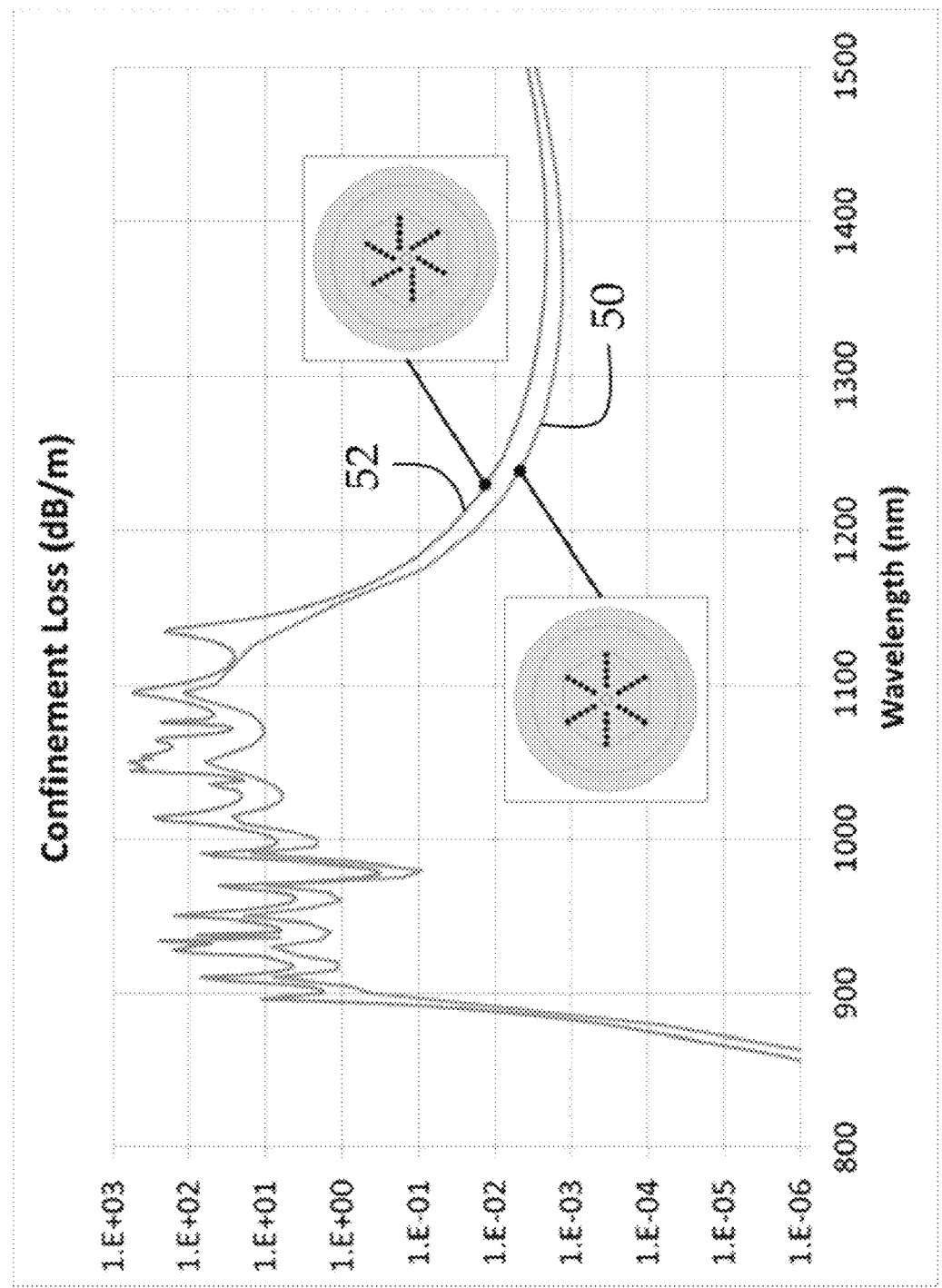
FIG. 3 shows modeling results for a design with filtering between 900 and 1100 nm, with a comparison of results from the radially extending geometry (plot 50) and the non-radially extending geometry (plot 52).

Selectively coupling to a fiber waveguide at a specific wavelength for the purpose of removing parasitic light for instance in an effort to promote amplification on weak rare-earth transitions in the presence of strong ones or to remove frequency shifted light from nonlinear effects in high power amplifiers has driven the development of novel waveguide structures. Previous work involving a structure having a low index ring surrounding the core waveguide has been used as a wavelength selective filter in Nd doped fibers. These structures are referred to as depressed well, trench or W-type waveguides and effectively filter away long wavelength light by weakening the guidance of light in a mode whose size exceeds some threshold. Those designs act as an embedded short pass filter which is inconvenient to apply to Nd based amplification near 1400 nm as there is a desirable filtering region between the pump and signal wavelengths. A notch filter is appropriate for such cases and the waveguide design described here has been used to create an embedded notch filter in optical fibers. FIG. 3 shows modeling results for such a design with filtering between 900 and 1100 nm, with a comparison of results from the radially extending geometry (plot 50) and the non-radially extending geometry (plot 52). The plot 52 shows increase of the losses throughout the filtering region for the non-radially extending case by 5-10 dB. This is a significant enhancement of the filtering design by the 13% reduction in the offset between the core and the first filtering element. Furthermore, the asymmetry leads to additional peaks in the filtering region which serve to enhance the filtering effect further, especially in the presence of perturbations due to the typical practice of winding the fiber in a coil to minimize the fiber device footprint. The results indicate that the non-radial case enhances losses in the filtering bands, in this case 900 nm to 1100 nm, while maintaining low loss outside of the filtering band. Details on the origin of these additional peaks are currently being investigated as part of ongoing development.

Figure 4A:
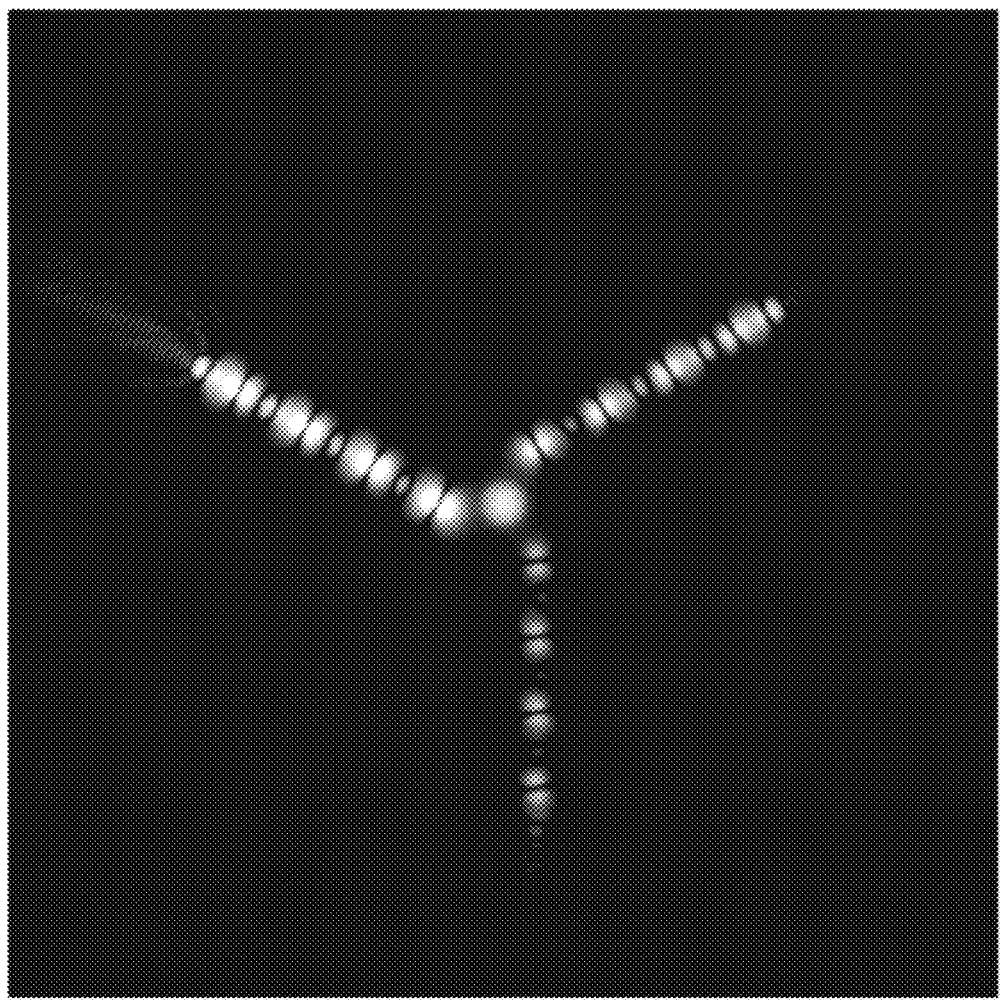
FIGS. 4A and 4B show two results of the solved modes or supermodes of the overall waveguide structure where the LP01 mode of the core couples to the LP11 mode of the filtering elements.
Figure 4B:
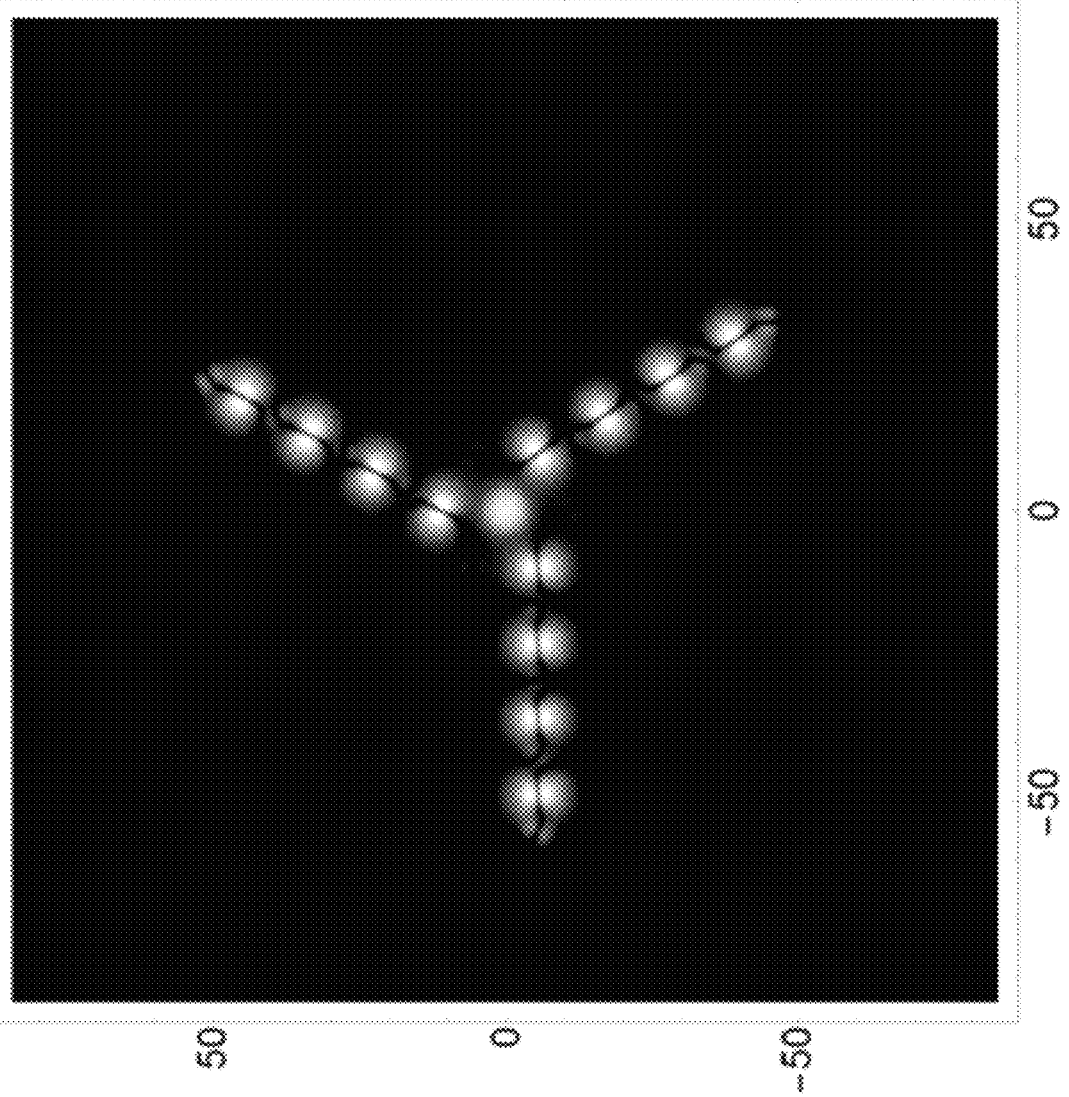

The substructure offset from a radially extending geometry also enables coupling into parity modes that are forbidden in the radially extending geometry. For LP01 to LP11 coupling between the main waveguide and the filtering waveguides respectively, the modes in the filtering substructure are such that field nodes are oriented along or perpendicular to the multi-element axis with each lobe having opposite polarity as shown in FIG. 4A. In the radially extending geometry, the node orientation along the multi-element axis, as shown in FIG. 4B, does not couple because the overlap between the core mode and the two lobes of different polarity in the LP11 mode of the first element is exactly equal, rendering the overlap integral null. Preliminary results show that while this parity mode is allowed in the waveguide structure, it remains to be determined if there is sufficient overlap with the core to impact the confinement loss. Thus, FIGS. 4A and 4B show two results of the solved modes or supermodes of the overall waveguide structure where the LP01 mode of the core couples to the LP11 mode of the filtering elements. The two supermodes pictured are plotted on a log scale, have significant overlap with the core and notably are of opposite parity.

All elements, parts and steps described herein are preferably included. It is to be understood that any of these elements, parts and steps may be replaced by other elements, parts and steps or deleted altogether as will be obvious to those skilled in the art.

The foregoing description of the technology has been presented for purposes of illustration and description and is not intended to be exhaustive or to limit the technology to the precise form disclosed. Many modifications and variations are possible in light of the above teaching. The embodiments disclosed were meant only to explain the principles of the technology and its practical application to thereby enable others skilled in the art to best use the technology in various embodiments and with various modifications suited to the particular use contemplated. The scope of the technology is to be defined by the following claims.

We claim:

1. An apparatus comprising:
   a core;
   a lattice of background material surrounding said core and including a subset of background material in direct contact with said core, wherein said subset comprises an inner boundary and an outer boundary, wherein said inner boundary is in contact with and is closer to said core than said outer boundary, wherein the distance from the center of said core to said outer boundary varies from a maximum value to a minimum value depending upon the direction of said distance from said core, wherein said minimum value is located in a valley between maximum values; and
   a first outcoupling element located in said valley.

2. The apparatus of claim 1, wherein said core comprises a first index of refraction that will support the propagation of a first wavelength and a second wavelength, wherein said background material comprises a second index of refraction that is less than that of said first index of refraction and wherein said first outcoupling element comprises a third index of refraction that will support the propagation of said second wavelength.

3. The apparatus of claim 2, wherein said first outcoupling element will not substantially support the outcoupling of said first wavelength.

4. The apparatus of claim 2, wherein said first outcoupling element will not support the outcoupling of said first wavelength.

5. The apparatus of claim 2, further comprising at least one additional outcoupling element in coupling proximity to said first outcoupling element and having said third index of refraction.

6. The apparatus of claim 5, wherein a line from the center of said core to the center of said first outcoupling element is not colinear with a line from the center of said first outcoupling element to the center of an element of said at least one additional outcoupling element.

7. The apparatus of claim 2, wherein said first index of refraction will support the propagation of at least one additional wavelength of electromagnetic radiation, wherein said third index of refraction will also support the propagation of said at least one additional wavelength of electromagnetic radiation.

8. The apparatus of claim 1, wherein said core comprises a circular cross-section.

9. The apparatus of claim 1, wherein all elements of said lattice of background material have a hexagonal cross-section.

10. The apparatus of claim 2, further comprising at least one additional outcoupling element in operable proximity to said first outcoupling element and having said third index of refraction, wherein each of said first outcoupling element and said at least one additional outcoupling element have a hexagonal cross-section, wherein a face of said first outcoupling element is in contact with a face of said at least one additional outcoupling element.

11. The apparatus of claim 1, wherein said subset of background material consists essentially of 6 elements each having a hexagonal cross-section, wherein each element of said 6 elements has a face in contact with two adjacent elements of said 6 elements, where the faces of each two adjacent faces define a line that intersects the center of said core and the center of said first outcoupling element in the cross section of said lattice.

12. The apparatus of claim 11, wherein the distance from a first face of each hexagonal element to a second face that is parallel to said first face of said each hexagonal element is h, wherein the distance from the center of said core to the center of said first outcoupling element is $$\sqrt{3h}.$$

13. The apparatus of claim 1, wherein said subset of background material consists essentially of 12 elements comprising a series of large elements alternating with smaller elements.

14. An apparatus, comprising:
- a core,
- a lattice of hexagonal elements surrounding said core, wherein the innermost hexagonal elements of said lattice are in contact with said core;
- at least one outcoupling branch configured to evanescently couple to said core, wherein said at least one outcoupling branch is configured in a line that does not intersect the center of said core.

15. The apparatus of claim 14, wherein said outcoupling branch includes a first coupling element that is closer to said core than all other coupling elements of said branch and wherein said first coupling element is a non-integer array unit spacing from said core wherein said array unit spacing is defined as h which is the flat to flat distance of a hexagonal element.

16. The apparatus of claim 15, wherein said first coupling element is less than 1 array unit from said core.

17. The apparatus of claim 15, wherein the distance from the center of said core to the center of said first coupling element is $$\sqrt{3}h.$$

18. An apparatus, comprising:
- a core;
- a lattice of background elements around said core, wherein said lattice includes a subset of elements around, in contact with and immediately adjacent to said core, wherein said subset of elements comprises a series of large elements alternating with smaller elements, wherein a first line drawn from the center of said core to the outer boundary away from said core of each of said large elements is longer than a second line drawn from the center of said core and that bisects said smaller element to its outer boundary away from said core; and
- a first branch element having a center located on a line colinear with said second line.

19. The apparatus of claim 18, wherein said core comprises a circular cross-section.

20. The apparatus of claim 18, further comprising a second branch element in contact with said first branch element, wherein a line drawn from the center of said second branch element to the center of said first branch element is not colinear with said second line.

* * * * *